United States Patent
Kim et al.

(10) Patent No.: US 7,328,294 B2
(45) Date of Patent: Feb. 5, 2008

(54) METHODS AND APPARATUS FOR DISTRIBUTING INTERRUPTS

(75) Inventors: Ted Kim, Los Angeles, CA (US); Denton E. Gentry, Jr., Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 843 days.

(21) Appl. No.: 10/011,899

(22) Filed: Dec. 3, 2001

(65) Prior Publication Data

US 2003/0105798 A1 Jun. 5, 2003

(51) Int. Cl.
G06F 13/24 (2006.01)
G06F 13/26 (2006.01)
G06F 9/46 (2006.01)

(52) U.S. Cl. ........................ 710/260; 710/264; 718/105
(58) Field of Classification Search ................ 395/733; 718/103, 104, 105; 710/206, 260, 268, 264
See application file for complete search history.

(56) References Cited

U.S. PATENT DOCUMENTS

| | | | | |
|---|---|---|---|---|
| 4,644,465 A | * | 2/1987 | Imamura | 710/263 |
| 4,933,846 A | * | 6/1990 | Humphrey et al. | 710/107 |
| 5,179,707 A | * | 1/1993 | Piepho | 710/260 |
| 5,410,715 A | * | 4/1995 | Ishimoto et al. | 710/264 |
| 5,428,794 A | * | 6/1995 | Williams | 710/268 |
| 5,566,352 A | * | 10/1996 | Wishneusky | 710/48 |
| 5,918,057 A | * | 6/1999 | Chou et al. | 710/260 |
| 6,205,508 B1 | * | 3/2001 | Bailey et al. | 710/260 |
| 6,233,643 B1 | * | 5/2001 | Andrews et al. | 710/316 |

OTHER PUBLICATIONS

InfiniBand™ Architecture Specification vol. 1 Release 1.0, Copyright © 1999, by InfiniBand Trade Association. All rights reserved. Oct. 24, 2000 Final pp. 1-30 (Table of Contents).
InfiniBand™ Architecture Specification vol. 2 Release 1.0, Copyright © 1999, by InfiniBand Trade Association. All rights reserved., All trademarks and brands are the property of the property of the respective owners., Oct. 24, 2000 Final. pp. 1-23 (Table of Contents); 58-64 (Chap. 4); 65-131 (Chap. 5); and 340-479 (Chap. 13).
Craig Peacock, " Interfacing the PC", pp. 1-15, Copyright 1997-2000, Monday Feb. 28, 2000.
Intel Developer Forum, "Infiniband Technology Prototypes White Paper" Crossroads, Compaq, Dell, Intel, LSI Logic. © 2000 Intel Corporation.

* cited by examiner

Primary Examiner—Meng-Al T. An
Assistant Examiner—Camquy Truong
(74) Attorney, Agent, or Firm—Darcy & Darby P.C.; M. David Ream (57) ABSTRACT

The present invention relates to handling interrupts in a multiprocessor system. An interrupt controller can receive input from a variety of interrupt sources, such as peripheral components and peripheral interfaces. Interrupts and their associated characteristics are identified. In one example, interrupt characteristics can be compared with characteristics of other interrupts handled by processors in the multiprocessor system. Interrupt characteristics are used to select a processor to run a routine for handling the associated interrupt. Intelligent selection provides efficient and effective distribution of interrupts.

26 Claims, 6 Drawing Sheets

| Identifier 303 | Scheduling Group 305 | Priority 307 | Recent Invocation (Warm Cache) 309 | Processor 311 | Time Information 313 | ... |
|---|---|---|---|---|---|---|
| 301 | 1 | 5 | n | 1 | 3:31 | ... |
| 504 | 1 | 5 | n | 2 | 5:24 | ... |
| 557 | 2 | 4 | y | 3 | 1:03 | ... |
| 558 | 2 | 3 | y | 3 | 1:14 | ... |
| ... | ... | ... | ... | ... | ... | ... |

METHODS AND APPARATUS FOR DISTRIBUTING INTERRUPTS

BACKGROUND OF THE INVENTION

1. Field of Invention

The present invention relates generally to interrupt handling. More particularly, the present invention relates to selecting processors in a multiprocessor system to run interrupt handlers.

2. Description of the Related Art

Peripheral components and peripheral interfaces use hardware interrupts to notify processors that attention is being requested. When a processor detects an interrupt, the processor saves information to allow the processor to later return to the current processing, and executes an interrupt handler or interrupt service routine. The interrupt handler or interrupt service routine provides instructions for processing the interrupt. To allow efficient handling of multiple peripherals, systems often use an interrupt controller to act as an intermediary between processors and peripherals. The interrupt controller prioritizes the various interrupts and sends them to particular processors. In multiprocessor systems, the interrupt controller not only prioritizes the interrupts, but can distribute them as well.

One conventional scheme for selecting processors is round-robin. A first identified interrupt is handled by a first processor, a second identified interrupt is handled by a second processor, a third identified interrupt is handled by the first processor, etc. Other conventional techniques bind peripheral components and peripheral interfaces to particular processors. In one example, interrupts arising from a communication adapter are handled by first processor, interrupts arising from a storage card are handled by a second processor, etc. Conventional techniques, however, fail to consider the characteristics associated with the interrupts. For example, a multiprocessor system may be handling two text message sessions and two processor intensive video sessions. Using a round-robin or a static binding methodology, the same processor may be assigned to handle both the processor intensive video sessions. The other processors may be handling the less processor intensive text message sessions. In this example, response time of the multiprocessor system may be slow even though ample processing resources are available.

Consequently, it is desirable to provide improved techniques for distributing interrupts to a plurality of processors for interrupt handling in the multiprocessor system.

SUMMARY OF THE INVENTION

The present invention relates to handling interrupts in a multiprocessor system. An interrupt controller can receive input from a variety of interrupt sources, such as peripheral components and peripheral interfaces. Interrupts and their associated characteristics are identified. In one example, interrupt characteristics can be compared with characteristics of other interrupts handled by processors in the multiprocessor system. Interrupt characteristics are used to select a processor to run a routine for handling the associated interrupt. Intelligent selection provides efficient and effective distribution of interrupts.

In one embodiment, a method for distributing interrupt load to processors in a multiprocessor system is provided. A first characteristic associated with a first interrupt is identified. A second characteristic associated with a second interrupt is identified. A first processor for running a first interrupt handler associated with the first interrupt is selected. The first processor is selected by comparing the first characteristic with the second characteristic. The selection of the first processor allows distribution of interrupt load.

In another embodiment, an interrupt controller for distributing interrupt load to processors in a multiprocessor system is provided. The apparatus includes an interrupt request register coupled to a plurality of interrupt sources, a priority resolver coupled to the interrupt request register and an interrupt distributor. The priority resolver is configured to receive interrupts from the interrupt request register and prioritize the interrupts. The interrupt distributor is coupled to the priority resolver and is configured to select a first processor for running a first interrupt handler associated with a first interrupt. The first processor is selected by comparing the first characteristic with a second characteristic associated with a second interrupt.

In another embodiment, a method for dynamic selection of a processor in a multiprocessor system is provided. A first interrupt is identified. A routine for handling the first interrupt is identified. The first interrupt is dispatched to the first processor upon checking a recent invocation indicator associated with the first processor to allow dynamic selection of the first processor for handling the first interrupt in a multiprocessor system.

In still another embodiment, a second hardware interrupt can also be identified. The second interrupt is dispatched to the first processor where a first interrupt characteristic and a second interrupt characteristic are different.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF THE EMBODIMENTS

Methods and apparatus are provided for dynamically distributing interrupts to a plurality of processors for servicing in a multiprocessor system. Peripheral components and peripheral interfaces use hardware interrupts to signal to a processor that it may need attention. Peripheral components are devices such as keyboards, co-processors, and system clocks. Peripheral interfaces are devices such as network cards, communication adapters, storage cards, modems, and communication ports. Peripheral components and peripheral interfaces are referred to herein collectively as peripherals.

It should be noted that a peripheral can be any hardware interrupt source. A peripheral may request the attention of a processor in many instances. In one example, an alarm associated with a timer is triggered. A processor is notified to handle the interrupt associated with the timer. In another example, a network interface may receive data from a client node. The processor is notified to handle and process the data from the client node. When a peripheral requests the attention of a processor, it typically sends a request to an interrupt controller, coupled to a variety of peripherals.

The identified interrupts may be associated with many different characteristics, such as the priority of the interrupt, the originating peripheral causing the interrupt, the type of the corresponding interrupt handler routine, the scheduling group, or whether the corresponding interrupt handler routine has been run recently. Any identifiable information associated with an interrupt is referred to herein as an interrupt characteristic. According to various embodiments, the characteristics of the interrupt are determined in order to intelligently and dynamically distribute interrupts to various processors in a multiprocessor system. In one embodiment, interrupts from a communication adapter associated with video sessions are identified as video sessions related interrupts and specifically distributed to separate processors. The benefit of sending video session associated interrupts to separate processors is that it can spread processor intensive computation more efficiently amongst the different processors.

In another embodiment, interrupts having the same priority are distributed to separate processors. Priority associated distribution makes it less likely that all high priority interrupts are handled by one processor or delayed behind lower priority interrupts. Characterization of the interrupts can allow an intelligent and efficient determination of how the interrupt should be distributed in a multiprocessor system. The interrupts characteristics can be used to select what processor the interrupt should be distributed to.

According to specific embodiments, the techniques of the present invention provide that interrupts associated with a common characteristic are distributed to different processors. In one example, interrupts associated operations performed with a storage card are distributed to separate processors for efficient data handling. In other embodiments, the interrupt handler routine associated with the interrupt is identified to determine whether a processor has recently invoked the same routine. If a processor has recently invoked the interrupt handler routine, it may be likely that information associated with the interrupt handler routine remains in the processor cache. An interrupt handler routine remaining in a processor cache is referred to herein as a warm cache. The interrupt is dispatched to the processor that has recently run the corresponding interrupt handler routine.

Figure 1:
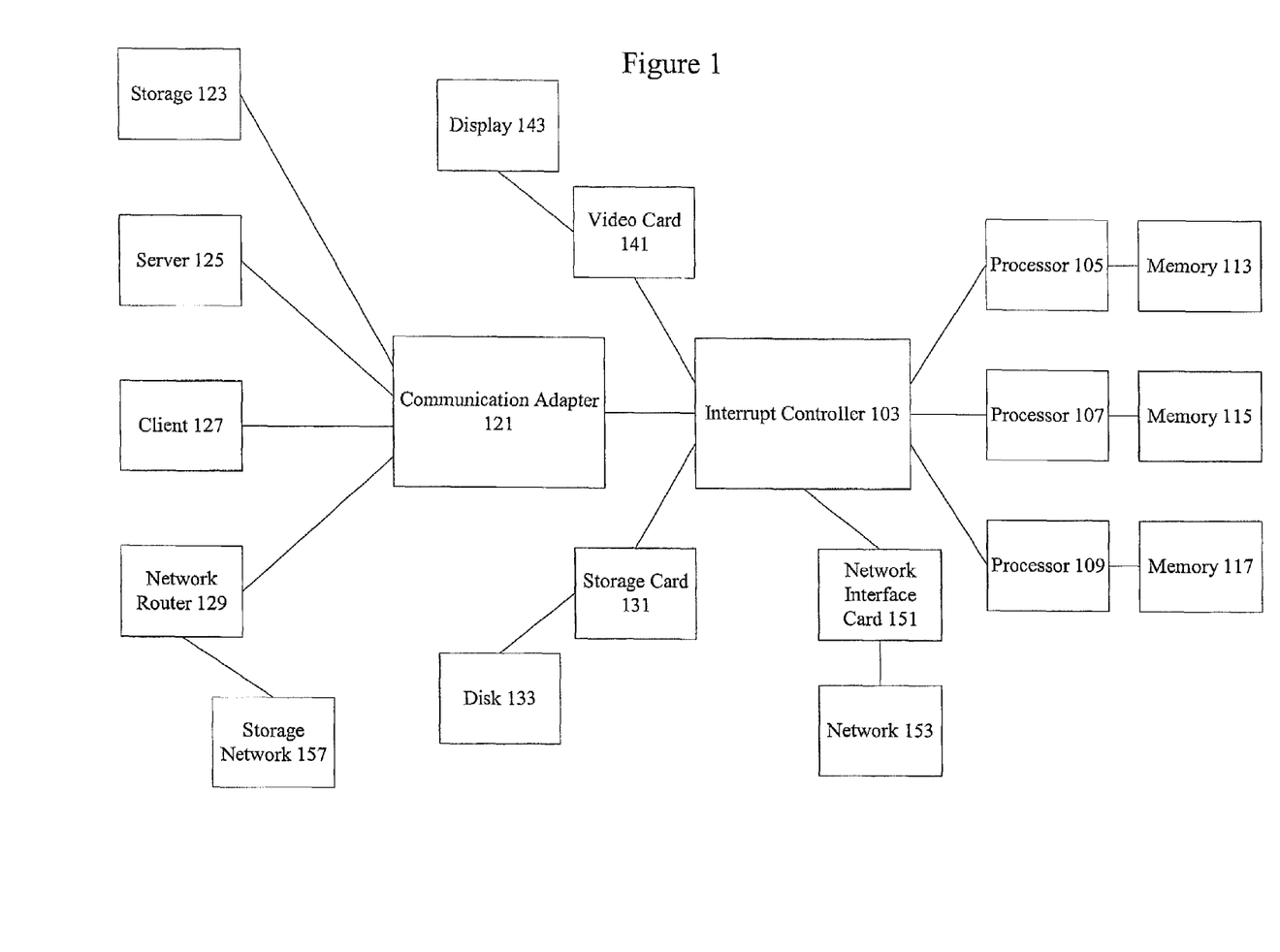
FIG. 1 is a diagrammatic representation of a system that can use the techniques of the present invention.

FIG. 1 is a diagrammatic representation of a system that can use the techniques of the present invention. Although the techniques will be discussed in the context of a communications adapter, it will be appreciated that a variety of different peripheral components and peripheral interfaces noted above can work with the techniques of the present invention. The interrupt controller 103 is coupled to processors 105, 107, and 109. Each processor may be associated with memory resources 113, 115, and 117. The interrupt controller may receive hardware interrupts from a variety of sources. Possible interrupt sources include a video card 141, a communication adapter 121, and a storage card 131. The video card 141 may be coupled to a display 143. The storage card 131 may be coupled to a hard disk 133. The network interface card 151 may be coupled to network 153. A communication adapter 121 such as a network card may be coupled to a variety of devices such as a server 125, the client 127, and a router 129. The communication adapter 121 may also be coupled to a storage device 123 and a storage or general purpose network 157 through a router 129. Communication adapters for handling a variety of components will be appreciated by one of skill in the art. In one example, the communication adapter 121 is an InfiniBand Communication Adapter.

The InfiniBand communication adapter provides that network nodes connected to a server can be other servers and clients as well as server components. The InfiniBand architecture replaces the standard bus architecture of a computer system with a message based fabric. Separate systems as well as nodes can be attached to be fabric. InfiniBand architecture is described in further detail in the InfiniBand Trade Association Specification 1.0 available from the Infiniband Trade Association, the entirety of which is incorporated by reference for all purposes. In one example, network storage 123 can be part of the InfiniBand architecture allowing access by processors 105, 107, and 109. In another examples, the network services accessed through network router 129 are made available to processors 105, 107, and 109. Session IDs could correspond to Infiniband completion queues. Completion queues can be used to signal when an operation has completed. The completion queue allows a decoupling of the processor and the communication adapter. Completion queues are described in more detailed in the InfiniBand Trade Association Specification.

As will be appreciated by one of skill in the art, a variety of peripheral components and peripherals interfaces can be sources of interrupts for the interrupt controller. A variety of network cards, communication adapters, storage cards, video cards, modems, etc., can all provide interrupts to the interrupt controller 103.

Figure 2:
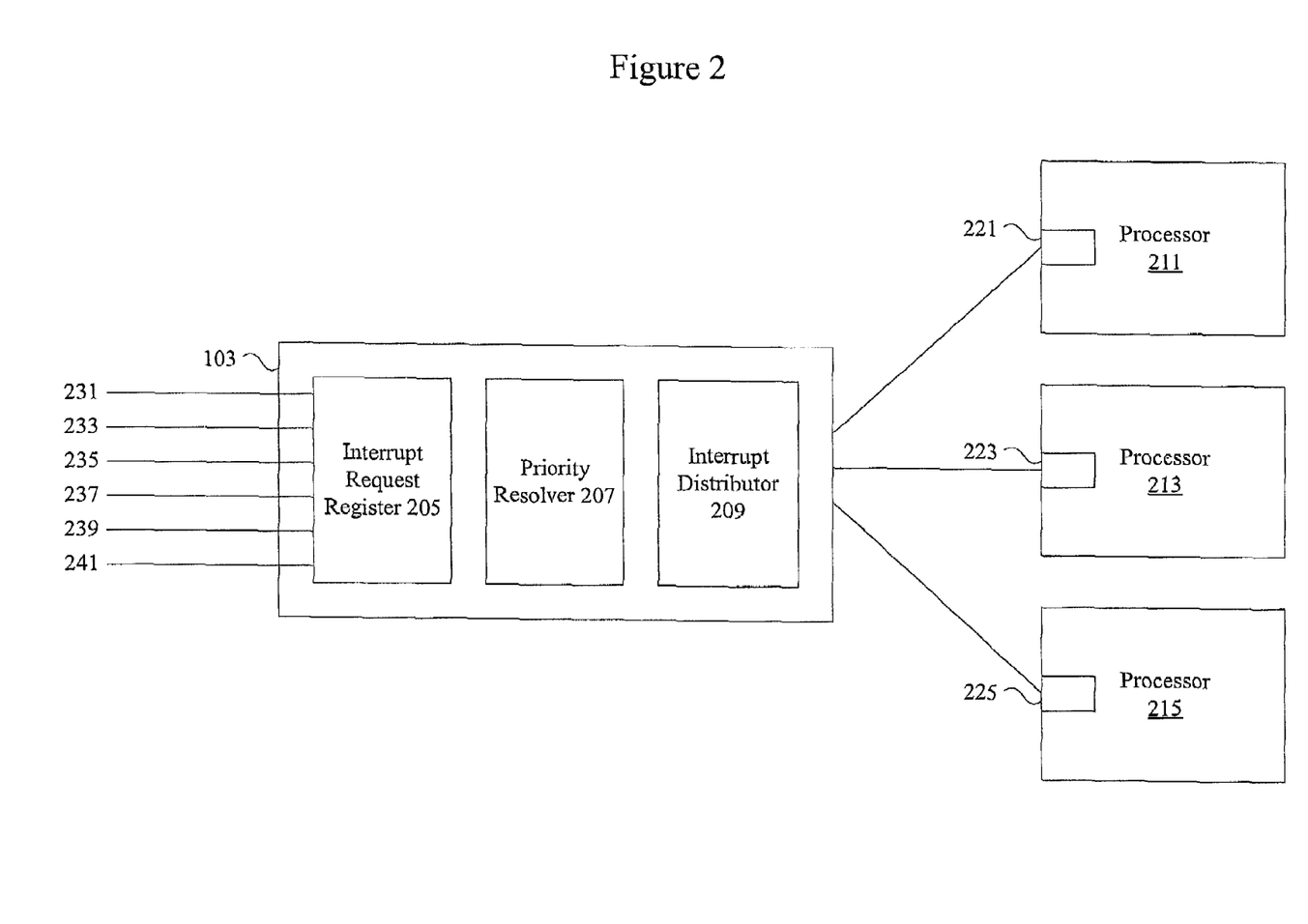
FIG. 2 is a diagrammatic representation depicting an interrupt controller.

FIG. 2 is a diagrammatic representation of one example of an interrupt controller. An interrupt controller 103 may receive interrupts from a plurality of input lines 231-241. The input lines may be coupled to a variety of peripheral components and peripheral interfaces as noted in FIG. 1. The interrupt controller is typically implemented in hardware and may be a separate device incorporated into a chipset associated with the processors in a multiprocessor system. The interrupt controller can include an interrupt request register 205. The interrupt request register 205 receives interrupts from the peripheral components and peripheral interfaces coupled to the interrupt controller through input lines 231-241. As will be appreciated by one of skill in the art, interrupts provided by the various peripherals can also be referred to as interrupt requests.

Interrupts received by the interrupt request register 205 can be prioritized at a priority resolver 207. According to various embodiments, interrupts are not prioritized. An interrupt distributor 209 can identify characteristics associated with the interrupts and determine what processor 211, 213, or 215 should handle the interrupt. Each processor includes an interrupt line 221, 223, and 225. In one example, the interrupt distributor 209 can signal a particular processor to handle an interrupt by raising a voltage on a particular interrupt line 221, 223, or 225. It should be noted that although the techniques of the present invention are described in the context of input interrupts, the techniques of the present invention apply to all interrupt sources, including output interrupt sources and exceptional conditions.

According to various embodiments, a communication adapter is integrated with an interrupt controller. The communication adapter receives inputs from and sends outputs to a variety of network nodes and devices. In conventional systems, a component video card receives interrupts from a single device. Consequently, the video card already has information about the type activity associated with the interrupt. A communications adapter, however, receives messages associated with interrupts from a variety of sources and consequently does not inherently have information about the type of activity associated with the interrupt. According to various embodiments, information is provided with each interrupt so that each input can be associated with a session or a separately addressable communications endpoint within the communications adapter. Input received by a communication adapter can be analyzed to determine characteristics associated with the input. An identifier such as a session ID can be assigned to the input. The associated characteristics can be used to populate the characteristics table shown in FIG. 3. Once the associated characteristics are populated in the characteristics table, feature inputs having the same session ID can be referenced quickly to determine characteristics associated with an interrupt used to notify a particular processor.

Figure 3:
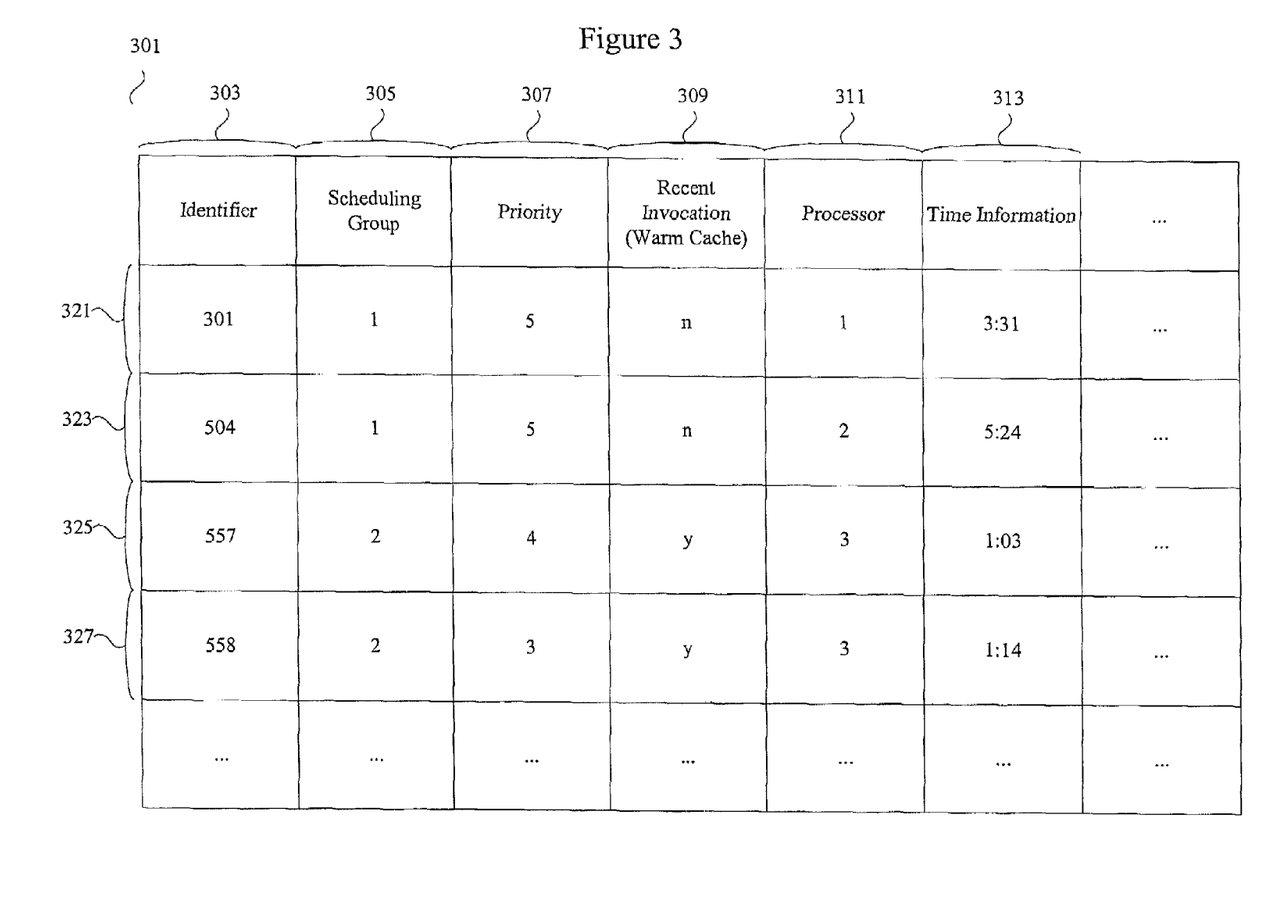
FIG. 3 is a diagrammatic representation of a characteristics table.

According to various embodiments, a communication adapter receives an input having a session ID. The communication adapter sends an interrupt along with information about the session ID to the interrupt controller. The interrupt controller then references the characteristics table to select a processor to handle the received input. If the session information and the associated characteristics are not already in the characteristics table, the table can be populated by network card, communication adapter driver, by the interrupt controller itself, or by the operating system software.

FIG. 3 is a diagrammatic representation of a table that can be referenced to determine characteristics associated with an interrupt. The characteristics table can be referenced using any identifier such as a session ID. It should be noted that although the techniques of the present invention are described in the context of using a session ID as an identifier, a variety of other identifiers can be used. Other possible identifier include low level hardware identifiers such as interrupt handler address or a communication endpoint. According to various embodiments, the identity of the routine for handling can interrupt can be used to reference characteristics associated with the interrupt, where the association between the session ID and the interrupt routine is handled in a separate table. In the session ID example, a session ID is associated with a particular session between a network node and a multiprocessor system. The session identifier numbers themselves can contain information. In one example, session IDs in a first range of numbers such as 1-500 are associated with TCP/IP flows while session IDs in a second range of numbers such as 501-1000 are associated with IPX flows. When traffic is received at a communication adapter, the communication adapter can provide the session ID along with the associated interrupt or interrupt request to the interrupt controller. According to various embodiments, the communications adapter itself can extract a session ID from a received message. If the identifier is already in the interrupt characteristics table at 301, table entries such as table entries 321, 323, 325 are referenced to determine the scheduling group 305 and priority 307 associated with the interrupt.

Scheduling groups can be assigned to particular types of input. For example, the scheduling group of one can be assigned to TCP/IP inputs received by the communication adapter. A scheduling group of two can be assigned to IPX inputs. A scheduling group of 4 can be assigned to video sessions while a scheduling group of 3 is assigned to the audio sessions. A scheduling group of 5 can be set for storage input from a device such as network storage. By determining the scheduling group 305 and priority 307 associated with the interrupt, a processor can be selected that is not actively handling interrupts associated with the same scheduling group 305 or the same priority 307. Priority can be assigned based on the urgency of the interrupt.

It can also be determined by reference in the characteristics table whether the interrupt handler associated with the session ID has been recently invoked at 309 by a processor shown at 311. As noted above, the recent invocation can be referred to as a warm cache. According to various embodiments, if it is determined that the interrupt handler associated with the session ID has been recently invoked, the interrupt handler can be run on the processor with the warm cache. It can also be determined whether the processor has run the interrupt handler recently by referencing timing information at 313. A wide range of timers can be used to determine whether an interrupt handler associated with an interrupt has recently run on a particular processor. Timers, timestamps, and/or alarms can all be used in various examples to update the warm cache indicators 309. In one example, a recent invocation flag such as that shown in column 309 can be set when the interrupt routine is run on a particular processor. The flag can be cleared in several manners. For example, the flag can be cleared when a particular time period has elapsed or during predetermined intervals when all flags are cleared. It should be appreciated that the amount of time that any interrupt handler is considered recently invoked can be widely varied based on parameters and predicted performance of a particular system.

Time periods can vary from a single processor clock cycle to a very large number of processor clock cycles. Processors that are expected to be frequently idle can be assigned a larger amount of time since new routines or instructions will not likely remove the interrupt handler from the cache associated with the processor. On the other hand, processors that perform computations during every clock cycle will likely remove an interrupt handler from cache very quickly. According to other embodiments, all values in column 309 are cleared after a predetermined period.

As noted above, by determining the characteristics associated with an interrupt, a processor that is not actively handling interrupts associated with the same characteristics can be selected. The characteristics of interrupts currently being handled by a particular processor in a multiprocessor system can be tracked using a scheduling group table. In one example, an interrupt controller references the characteristics table to determine what scheduling group an interrupt is associated with. The interrupt controller can then reference scheduling group tables to determine what processors are currently scheduled to handle interrupts with the same scheduling group.

Figure 4:
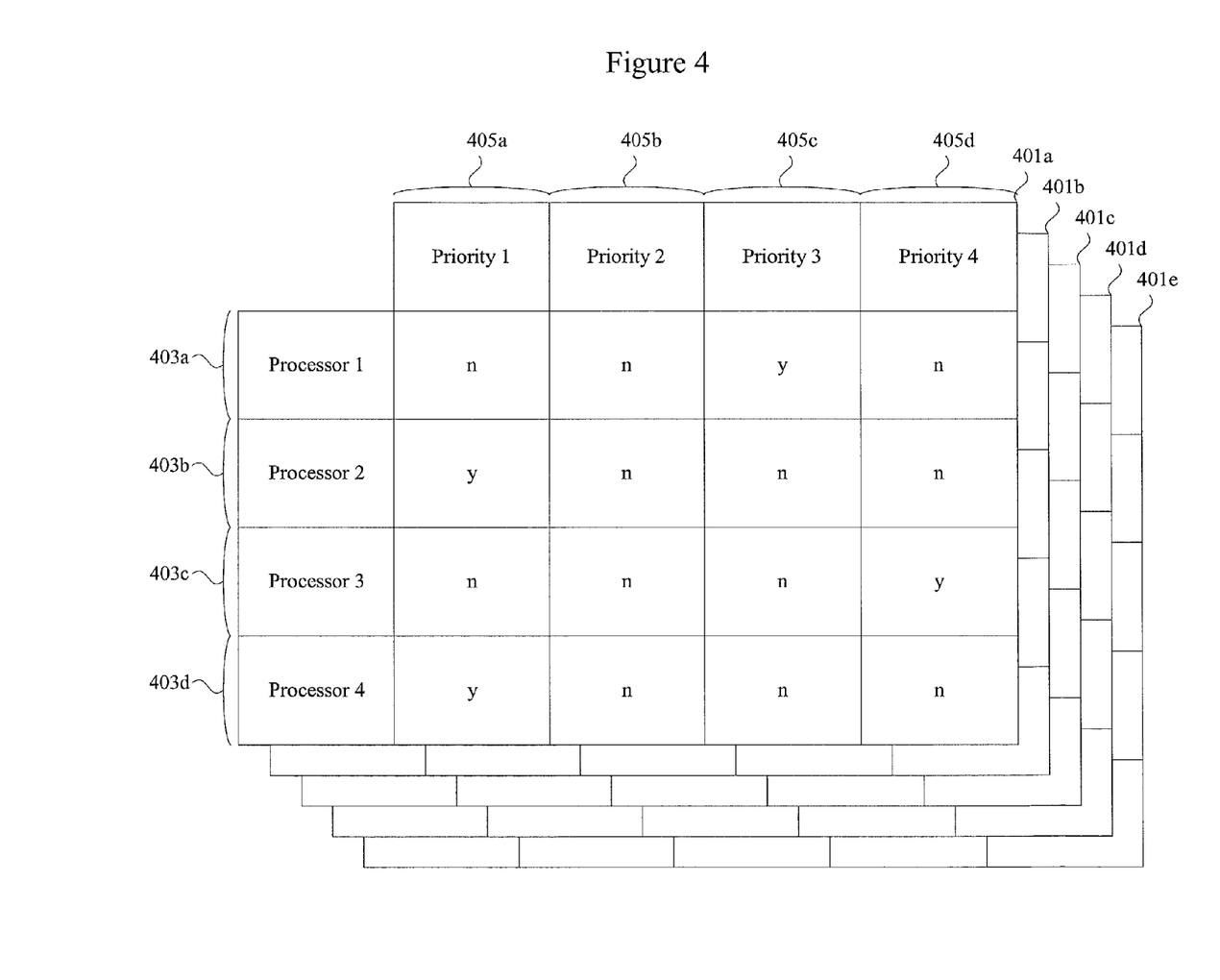
FIG. 4 is a diagrammatic representation of a scheduling group table.

FIG. 4 is a diagrammatic representation of a scheduling group table that can be used implement the techniques of the present invention. Each scheduling group table 401*a-e* can have rows indicating referencing different processors and columns showing different priorities. A scheduling group can first be determined. The scheduling group can then be referenced to determine what processor 403*a-d* is running an interrupt handler with the same scheduling group. The priority of the interrupt 405*a-d* scheduled on the processor can also be determined.

According to various embodiments, different tables can be used. In one example, the priority is not considered and the scheduling group table may be a table with different scheduling groups as the rows and the different processors as the columns. The tables can be implemented in hardware using bit masks. A bit block can be used to first reference information relevant to the scheduling group. A bit mask can then be used to isolate information for a relevant processor and the priority of the interrupt handler running on that processor can be determined by again using a bit mask. By using bit masks, the scheduling group tables can be easily implemented on components such as an ASIC or programmable chip.

Figure 5:
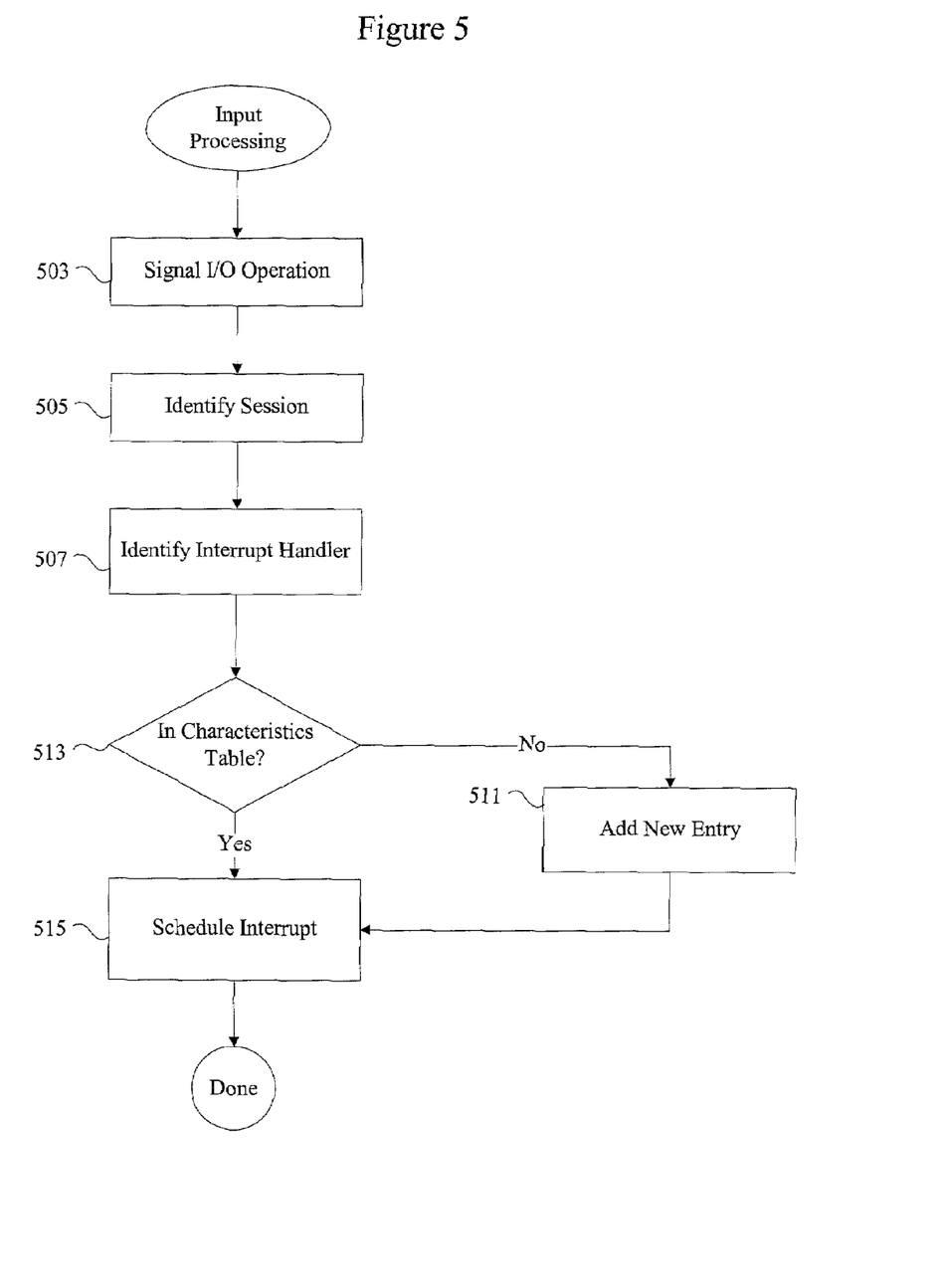
FIG. 5 is a process flow diagram depicting input processing by an interrupt controller

FIG. 5 is a process flow diagram depicting input processing by an interrupt controller. At 503, the interrupt controller can receive an input from an interrupt source. At 505, the interrupt is identified. An identifier such as a session ID can be used to reference characteristics information.

According to various embodiments, characteristics can be associated with an interrupt by determining the characteristics of an interrupt handler for processing the interrupt. An interrupt handler may be associated with a particular scheduling group or priority. Instead of referencing an interrupt in a characteristics table, an interrupt handler is first identified. Techniques for identifying an interrupt handler at 507 for processing interrupts will be appreciated by those of skill in the art. Characteristics associated with the interrupts can be determined by looking at the characteristics associated with the interrupt handler. For example, and interrupt handler such as to a network packet classifier can be assigned a scheduling group of 1 and a priority of 3. An interrupt handler for processing video input can be assigned a scheduling group of 2 and a priority of 1. An interrupt handler for processing data messages can be assigned a scheduling group of 3 and a low priority of 5. As will be appreciated by one of skill in the art, a wide range of numbers, letter, identifiers, and values can be used to indicate various interrupt characteristics.

In one embodiment, the interrupt controller performs a table look up at 513 to determine characteristics associated with the interrupt using the session identifier. If the session identifier is not already in the table, a new entry can be added at 511. The new entry can be added by thereby the interrupt controller, or by device driver associated with the communication adapter. The interrupt controller can also identify an interrupt handler for a processor to run in order to process the input.

As noted above, characteristics associated with the interrupt can be determined by referencing the characteristics table or by referencing characteristics associated with interrupt handlers. In one embodiment, the characteristics table stores the address of the interrupt handler instead of the session ID. The characteristics table can be referenced by determining the routine for handling an interrupt. After the characteristics associated with the interrupts are identified, the interrupt can be scheduled with a selected processor at 515. Scheduling and interrupt with a particular processor is described in more detail below.

Figure 6:
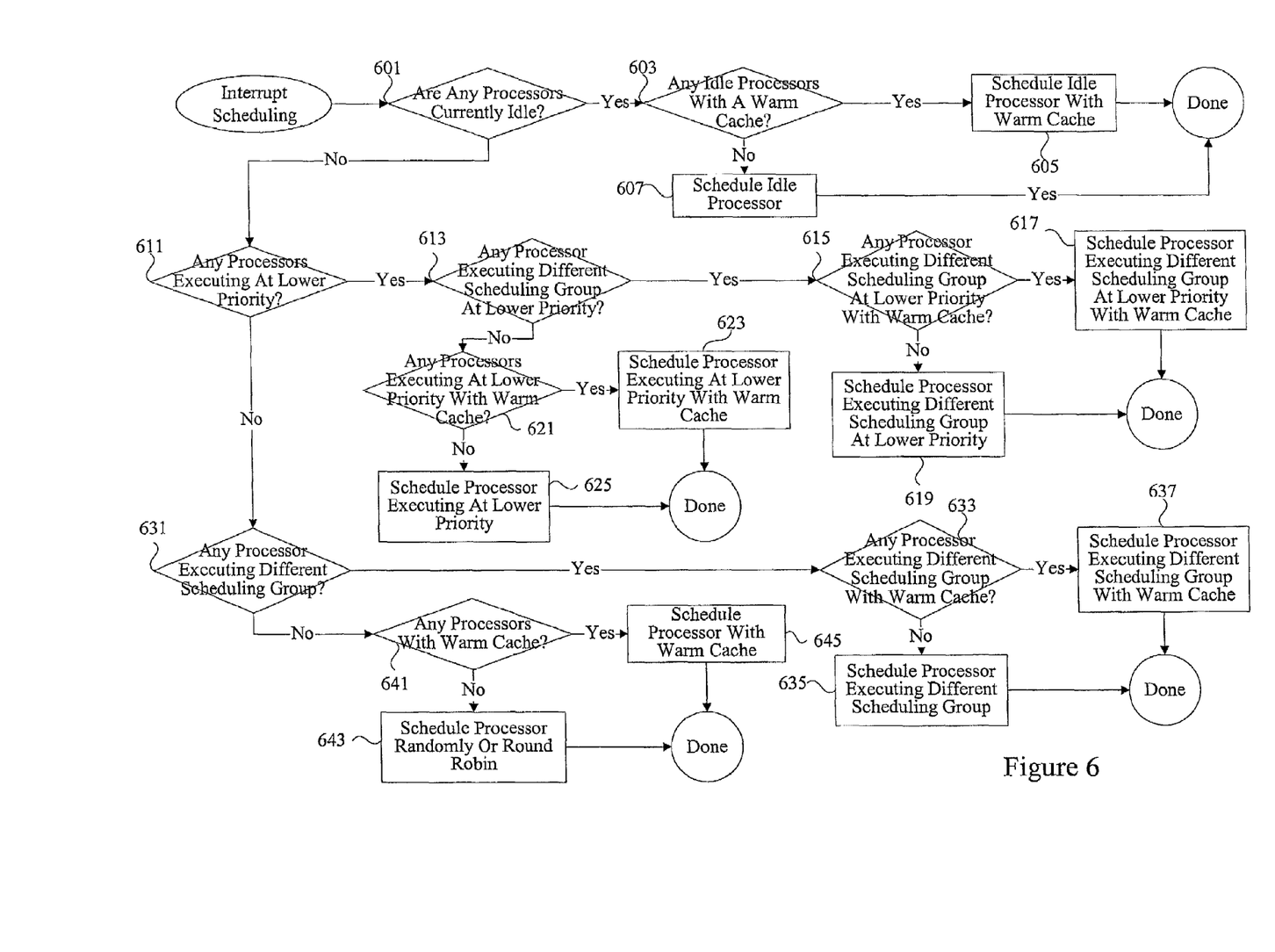
FIG. 6 is a process flow diagram depicting techniques for selecting a processor for handling an interrupt.

FIG. 6 is a process flow diagram depicting techniques for selecting a processor for handling an interrupt. According to various embodiments, it is determined at 601 whether any processors are currently idle. If any processors are idle, interrupt handlers could be scheduled on one of these idle resources. At 603, it is determined if any of these idle processors has a warm cache. In other words, it is determined if any of these idle processors has recently run the relevant interrupt handler. If no idle processor has a warm cache at 603, any idle processor can be selected using a variety of the mechanisms such as round-robin or random. If an idle processor is determined to have a warm cache at 603, the idle processor is selected at 605. Otherwise a processor without warm cache is selected at 607. If none of the processors are currently idle, it is determined if any processors are running at a lower priority at 611.

If it is determined that there are processors executing at a lower priority at 611, then it is determined at 613 whether any processors are executing a different scheduling group at a lower priority. A check is then made for warm cache at 615. If there are processors executing at lower priority in a different scheduling group with warm cache, then one of these processors is selected at 617. Otherwise any processor executing at lower priority in a different scheduling group is selected at 619. It should be noted that according to various embodiments of the present invention, interrupt handlers of the same scheduling group are scheduled on different processors, it possible.

If none of the processors executing at lower priority are of a different scheduling group as determined at 613, the process flow continues at 621 where it is determined if any processor executing at lower priority has a warm cache. If a processor has a warm cache, the processor is selected at 623. If no processor has a warm cache, any processor executing at a lower priority can be selected at 625.

If there are no processors executing at lower priority, the process flow continues at 631. At 631, it is determined if any processors are executing a different scheduling group. If so, a processor from this group is selected after checking for the additional possibility of warm cache at 633. If a processor in a different scheduling group with warm cache can be found, it is selected at 637. Otherwise, the selection occurs among any other processors in a different scheduling group at 635.

At 631, if it is determined that no processor was executing in a different scheduling group, then the process flow continues at 641. At 641, a check is made for any processor with warm cache. If one is found, it is selected at 645. Otherwise, techniques such as round-robin or random selection can be used to choose the processor at 643.

It should be noted that different processing techniques can be used to schedule interrupts. In one embodiment, idle processors are first identified. A scheduling group is then considered. Priority is only considered if the scheduling group characteristic is not determinative. The interrupt controller selects a processor not already running the handler from the same scheduling group to handle an interrupt. For example, if only the first three processors in a four processor system are handling interrupts associated with scheduling group 2, the fourth processor can be automatically selected to handle the interrupt. The scheduling group comparisons can be made by referencing the characteristics table using an identifier to determine a scheduling group and subsequently checking scheduling group tables to determine whether a particular processor in a multiprocessor system is handling interrupts associated with the scheduling group. If a processor not actively handling interrupts with the same scheduling group is located, that processor is selected. If all processors are actively handling interrupts with the same scheduling group, the interrupt controller looks at the priority of the interrupt.

As will be appreciated by one of skill in the art, selecting a processor using interrupt characteristics can be performed in a variety of manners. According to various embodiments, scheduling group is considered before priority is determined. According to other embodiments, recent invocation is checked before determining scheduling group and priority. According to still other embodiments, one or more other factors can be used in sequence. For example, after a subset of processors not running interrupt handlers with the same scheduling group are determined, priorities of active interrupts being handled by the subset of processors can be determined.

Selecting a processor using scheduling group, priority, and recent invocation determinations allows efficient and effective scheduling decisions without excessive overhead. Minimizing overhead can be particularly important in interrupt scheduling, as large numbers of interrupts can be received in very small periods of time at an interrupt controller. In one embodiment, the techniques of the present invention can be hard-wired on an ASIC. According to other embodiments, the techniques can be implemented on a programmable chip.

Although only a few embodiments of the present invention have been described, it should be understood that the present invention may be embodied in many other specific forms without departing from the spirit or the scope of the present invention. By way of example, although the steps associated with the various processes and methods of the present invention may be widely varied. In general, the steps associated with the methods may be altered. For instance, the illustrative embodiment described above considers priority before determining whether a scheduling group is identical. However, it will be appreciated that characteristics can be considered in any order or even simultaneously.

While the invention has been particularly shown and described with reference to specific embodiments thereof, it will be understood by those skilled in the art that changes in the form and details of the disclosed embodiments may be made without departing from the spirit or scope of the invention. For example, the embodiments described above may be implemented using firmware, software, or hardware. Moreover, embodiments of the present invention may be employed in a variety of operating environments and should not be restricted to the ones mentioned above. Therefore, the scope of the invention should be determined with reference to the appended claims.

What is claimed is:

1. A method for distributing interrupt load to processors in a multiprocessor system, the method comprising:
   identifying a first characteristic associated with a first interrupt, wherein the first characteristic indicates that the first interrupt corresponds to an operation performed with a first device;
   identifying a second characteristic associated with a second interrupt, wherein the second characteristic indicates that the second interrupt corresponds to an operation performed with the first device;
   selecting a first processor for handling the first interrupt and a second processor for handling the second interrupt, wherein different processors are selected for handling interrupts from the same device to distribute load for interrupts from the same device, wherein the first characteristic identifies a scheduling group of the first interrupt and the second characteristic identifies a scheduling group of the second interrupt, wherein the first processor is selected based on whether the first processor is handling an interrupt having a scheduling group that is different from a scheduling group of the first interrupt, and wherein the second processor is selected based on whether the second processor is handling an interrupt having a scheduling group that is different from a scheduling group of the second interrupt; and
   wherein the first and second characteristics also identify a priority of the interrupt, an originating peripheral causing the interrupt, a type of a corresponding interrupt handler routine, the scheduling group, or whether the corresponding interrupt handler routine was recently run.

2. The method of claim 1, wherein the second characteristic is maintained by an interrupt controller.

3. The method of claim 1, wherein the second characteristic is maintained by a communication adapter.

4. The method of claim 1, wherein the first characteristic comprises a protocol of the message triggering the first interrupt.

5. The method of claim 1, wherein the first characteristic comprises a session of the message triggering the first interrupt.

6. The method of claim 1, wherein the first characteristic comprises a priority of the first interrupt, wherein first processor is selected based on both the scheduling group and the priority of the first interrupt.

7. The method of claim 1, wherein the first processor is selected for handling the first interrupt if the first processor is handling an interrupt having a scheduling group that is different from the scheduling group of the first interrupt.

8. The method of claim 1, wherein comparing the first characteristic with the second characteristic comprises determining whether the characteristics are different.

9. The method of claim 1, wherein the first processor is configured to run an interrupt handler in parallel with a second processor, and wherein the first processor is selected based on both the scheduling group of the first interrupt and on whether the first processor has a warm cache with respect to an interrupt handler corresponding to the first interrupt.

10. An apparatus for distributing interrupt load to processors in a multiprocessor system, the apparatus comprising:
   means for assigning a first characteristic to a first interrupt;
   means for assigning a second characteristic to a second interrupt;
   means for identifying the first characteristic associated with the first interrupt, wherein the first characteristic indicates that the first interrupt corresponds to an operation performed with a first device;
   means for identifying the second characteristic associated with the second interrupt, wherein the second characteristic indicates that the second interrupt corresponds to an operation performed with the first device;
   means for selecting a first processor for handling the first interrupt and a second processor for handling the second interrupt, wherein different processors are selected for handling interrupts from the same device to distribute load for interrupts from the same device, wherein the first characteristic identifies a scheduling group of the first interrupt and the second characteristic identifies a scheduling group of the second interrupt, wherein the first processor is selected based on whether the first processor is handling an interrupt having a scheduling group that is different from a scheduling group of the first interrupt, and wherein the second processor is selected based on whether the second processor is handling an interrupt having a scheduling group that is different from a scheduling group of the second interrupt; and
   wherein the first and second characteristics also identify a priority of the interrupt, an originating peripheral causing the interrupt, a type of a corresponding interrupt handler routine, the scheduling group, or whether the corresponding interrupt handler routine was recently run.

11. The apparatus of claim 10, wherein if the first processor is handling an interrupt having a scheduling group that is different from the scheduling group of the first interrupt, then the means for selecting selects the first processor for handling the first interrupt.

12. The apparatus of claim 10, wherein the means for selecting selects the first processor based on both the scheduling group and the priority of the first interrupt.

13. The apparatus of claim 10, wherein the first processor is configured to run an interrupt handler in parallel with a second processor and wherein means for selecting selects the first processor based on both the scheduling group of the first interrupt and on whether the first processor has a warm cache with respect to an interrupt handler corresponding to the first interrupt.

14. The apparatus of claim 10, wherein comparing the first characteristic with the second characteristic comprises determining whether the characteristics are different.

15. The apparatus of claim 10, wherein the apparatus is an interrupt controller.

16. A method for dynamic selection of a processor in a multiprocessor system, the method comprising:
    identifying a first interrupt from a communications adapter, the first interrupt including information identifying a communications session associated with the first interrupt;
    identifying a routine for handling the first interrupt;
    dispatching the first interrupt to a first processor upon checking a recent invocation indicator associated with the first processor to confirm that the first processor has a warm cache with respect to an interrupt handler corresponding to the first interrupt;
    identifying a second interrupt; and
    dispatching the second interrupt to the first processor if a first characteristic corresponding to the first interrupt and a second characteristic corresponding to the second interrupt are different and if the first and second interrupts are associated with different scheduling groups;
    wherein the first and second characteristics identify a priority of the interrupt, an originating peripheral causing the interrupt, a type of a corresponding interrupt handler routine, the scheduling group, or whether the corresponding interrupt handler routine was recently run.

17. The method of claim 16, wherein the second interrupt is dispatched to the first processor if the first and second interrupts correspond to messages of different protocols.

18. The method of claim 16, wherein the second interrupt is dispatched to the first processor if the first and second interrupts are associated with different sessions.

19. The method of claim 16, wherein the second interrupt is dispatched to the first processor if the first and second interrupts have different priorities.

20. The method of claim 16, wherein the first processor is configured to running the routine for handling the interrupt in parallel with a second processor.

21. An apparatus for dynamic selection of a processor in a multiprocessor system, the apparatus comprising:
    means for identifying a first interrupt from a communications adapter, the first interrupt including information identifying a separately addressable communications endpoint within the communications adapter;
    means for identifying a routine for handling the first interrupt;
    means for dispatching the first interrupt to a first processor upon checking a recent invocation indicator associated with the first processor to confirm that the first processor has a warm cache with respect to an interrupt handler corresponding to the first interrupt;
    means for identifying a second interrupt;
    means for dispatching the second interrupt to the first processor if a first interrupt characteristic and a second interrupt characteristic are different and if the first and second interrupts are associated with different scheduling groups; and
    wherein the first and second characteristics identify a priority of the interrupt, an originating peripheral causing the interrupt, a type of a corresponding interrupt handler routine, the scheduling group, or whether the corresponding interrupt handler routine was recently run.

22. The apparatus of claim 21, wherein the second interrupt is dispatched to the first processor if the first and second interrupts correspond to messages of different protocols.

23. The apparatus of claim 21, wherein the second interrupt is dispatched to the first processor if the first and second interrupts are associated with different sessions.

24. The apparatus of claim 21, wherein the second interrupt is dispatched to the first processor if the first and second interrupts have different priorities.

25. The apparatus of claim 21, wherein the first processor is configured to run the routine for handling the interrupt in parallel with a second processor.

26. The apparatus of claim 21, wherein the apparatus is an interrupt controller.

\* \* \* \* \*

UNITED STATES PATENT AND TRADEMARK OFFICE
CERTIFICATE OF CORRECTION

PATENT NO. : 7,328,294 B2  Page 1 of 1
APPLICATION NO. : 10/011899
DATED : February 5, 2008
INVENTOR(S) : Kim et al.

It is certified that error appears in the above-identified patent and that said Letters Patent is hereby corrected as shown below:

On the Title page, Item (56), under "Other Publications", in column 2, line 3, delete "Final pp." and insert -- Final. PP. --, therefor.

On the Title page, Item (56), under "Other Publications", in column 2, line 5, delete "reserved.," and insert -- reserved. --, therefor.

On the Title page, Item (56), under "Other Publications", in column 2, line 6, after "are the property" delete "of the property".

On the Title page, Item (56), under "Other Publications", in column 2, line 7, delete "owners.," and insert -- owners. --, therefor.

On the Title page, Item (56), under "Other Publications", in column 2, line 11, delete ""Infiniband" and insert -- "InfiniBand* --, therefor.

On the Title page, Item (74), under "Attorney, Agent, or Firm", in column 2, line 1, delete "Darcy" and insert -- Darby --, therefor.

In column 2, line 50, after "controller" insert -- . --.

In column 4, line 18, delete "Infiniband" and insert -- InfiniBand --, therefor.

In column 4, line 24, delete "Infiniband" and insert -- InfiniBand --, therefor.

Signed and Sealed this

Twentieth Day of May, 2008

JON W. DUDAS
*Director of the United States Patent and Trademark Office*